United States Patent [19]

Sulzer

[11] Patent Number: 4,710,828
[45] Date of Patent: Dec. 1, 1987

[54] TRACKING ALIGNMENT FOR A ROTATING MAGNETIC TRANSDUCER HEAD

[75] Inventor: Jean F. Sulzer, Sevres, France

[73] Assignee: Enertec, Sevres, France

[21] Appl. No.: 741,515

[22] Filed: Jun. 5, 1985

[30] Foreign Application Priority Data

Jun. 28, 1984 [FR] France .................................. 84 1023

[51] Int. Cl.⁴ ........................ G11B 21/02; G11B 5/58
[52] U.S. Cl. ...................................... 360/75; 360/109
[58] Field of Search .................. 360/10.2, 75, 77, 109, 360/129, DIG. 1

[56] References Cited

U.S. PATENT DOCUMENTS

| | | | |
|---|---|---|---|
| 3,670,113 | 6/1972 | Bragas | 360/75 X |
| 4,167,762 | 9/1979 | Hashizaki et al. | 360/77 |
| 4,314,284 | 2/1982 | Sato et al. | |
| 4,366,515 | 12/1982 | Takano et al. | 360/109 |
| 4,446,497 | 5/1984 | Hirayama | 360/109 |
| 4,564,876 | 1/1986 | Takahashi et al. | 360/77 X |

FOREIGN PATENT DOCUMENTS

| | | |
|---|---|---|
| 0030469 | 6/1981 | European Pat. Off. . |
| 2276653 | 1/1976 | France . |
| 2365853 | 4/1978 | France . |
| 57-98130 | 6/1982 | Japan ................................. 360/109 |
| 58-97127 | 6/1983 | Japan ................................. 360/109 |
| 1114977 | 5/1968 | United Kingdom . |

*Primary Examiner*—Aristotelis M. Psitos
*Attorney, Agent, or Firm*—Dale Gaudier

[57] ABSTRACT

The present invention provides a simple apparatus for modifying at will the trajectory of heads in a rotating head magnetic recorder (for example, when the playback speed is changed) without introducing any active elements in the moving parts. Fixed electromagnets, controlled by a position sensor, control pendulum movements of the heads oscillating under centrifugal force due to their rotation.

15 Claims, 6 Drawing Figures

TRACKING ALIGNMENT FOR A ROTATING MAGNETIC TRANSDUCER HEAD

This invention relates to rotating magnetic transducer heads used, for example, with tape recordings, and relates particularly to a technique for maintaining the correct tracking angle despite fluctuations in tape or head speeds.

Signals recorded on magnetic tape may be arranged in parallel tracks diagonal to the length of the tape. For playback, the tape is passed partially around a drum which has a transducer head rotating on an axis diagonal to the path of the tape. The tangential speed of the head is greater than the speed of the tape and the tracks are offset along the tape by the distance the tape moves during one head revolution. Several heads attached to the same rotor and spaced angularly apart can be used to trace out tracks as double or multiple interleaved helixes.

It is difficult to synchronize the tape and head speeds so that heads follow the tracks. Gauge marks are usually provided along the edge of the tape to assist a sensor in synchronizing the tape and head speeds. If the tape speed is accelerated or reduced to modify the flow of information, the angle traced by the heads must also be modified. The instantaneous amplitude of this correction is a substantially linear function of the angular position of the head with respect to the portion of the track being scanned. When the tape is being read through an arc 180° around a drum, the correction is a triangular wave with the same period as the rotating heads. The angle of the head trajectory relative to the tape has, in the past, commonly been adjusted by using brakes to slow down the tape drive capstan or the head-drum, as appropriate. This is inefficient and increases the mass of the playback machine.

Besides correcting the scanning speeds, recent techniques have mounted the transducer heads on piezo-electric struts which are displaceable in proportion to an applied electrical voltage. U.S. Pat. No. 3,787,616 supports the heads on leaves with piezo-electric elements. When synchronization loss is detected, a voltage can be applied to bend the leaves up or down, to advance or retard the start of reading a track. The voltage is determined by the sawtooth pattern just mentioned, or is calculated by a control loop, and it is transmitted to the head support rotor-leaves by brushes and sliding contacts. However, an ongoing speed difference eventually deflects the leaves to their limits, after which no further speed compensation is possible. In U.S. Pat. No. 4,410,918, when a leaf reached its maximum deflection in one direction, it is quickly shifted to the opposite maximum deflection. This corrects ongoing dissynchronisation, but shifting the heads either skips or re-reads a track. Even within the range of corrections possible, the head is simply positioned to coincide with one point, such as the start, of each track. Aside from that point, speed differences cause tracking deviations. The head is still scanning at a different angle than the track.

Use of piezo-electric struts requires at least one sliding contact and brush per head. Sliding contacts are undesirable because they occupy space, increase the unsupported shaft length, create friction losses, and are subject to wear. These techniques are tedious to implement, particularly with applications such as high speed digital recorders for instrumentation or television, which involve tangential speeds above 50 m/s and thus centrifugal forces that impede the deviation of piezo-electric struts. For example, for an 8 centimeter diameter drum, a tangential speed of 40 m/s translates into a centrifugal force of 40,000 m/s$^2$ (4000 G).

The limited excursions of piezo-electric struts preclude them from applications utilizing several heads in parallel and requiring strong accelerations.

There remains, therefore, a need for a better technique to correct tracking angle errors.

In the present invention, speed differential-caused tracking angle errors are corrected by deflecting the transducer head substantially parallel to its axis of rotation while scanning each track. A head trajectory modification is needed for scanning a track on each revolution of the head. The head can be made to oscillate once per revolution traverse to its plane of rotation, thereby providing an appropriate deflection which varies almost linearly with the passage of the track being read.

A preferred embodiment of invention includes a rotatable shaft, a support attached to the axial center of the shaft, adapted to rotate, and to be relatively inflexible, in a plane perpendicular to the shaft, and to be relatively flexible in the direction parallel to the shaft, and a transducer head attached to the outer end of the support. The support rotates in a gap between two disks or cylindrical members coaxial to the shaft and having a radius slightly less than the radial dimension of the support with the head. As the head passes one or more magnets at the periphery of the disks, a magnetic force deflects the head, causing it to oscillate. Other purposes and advantages will be understood with reference to the appended drawings, wherein:

Figure 1:
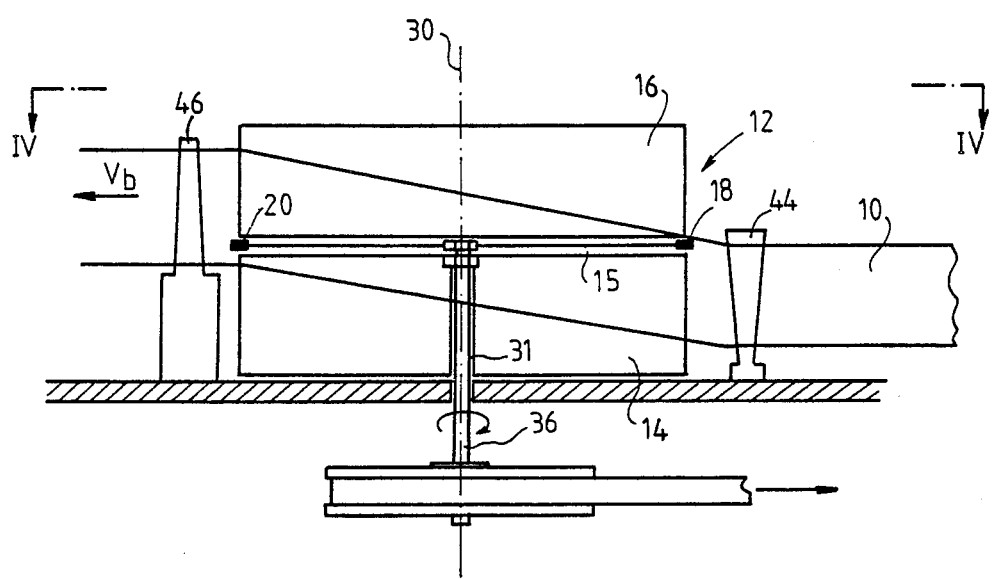
FIG. 1 is a cross section of a transducer head assembly, showing the stationary disks, the rotating head supports and the heads in the slot between the disks, and, in dotted outline, a magnetic tape passing diagonally by the drum.
Figure 4:
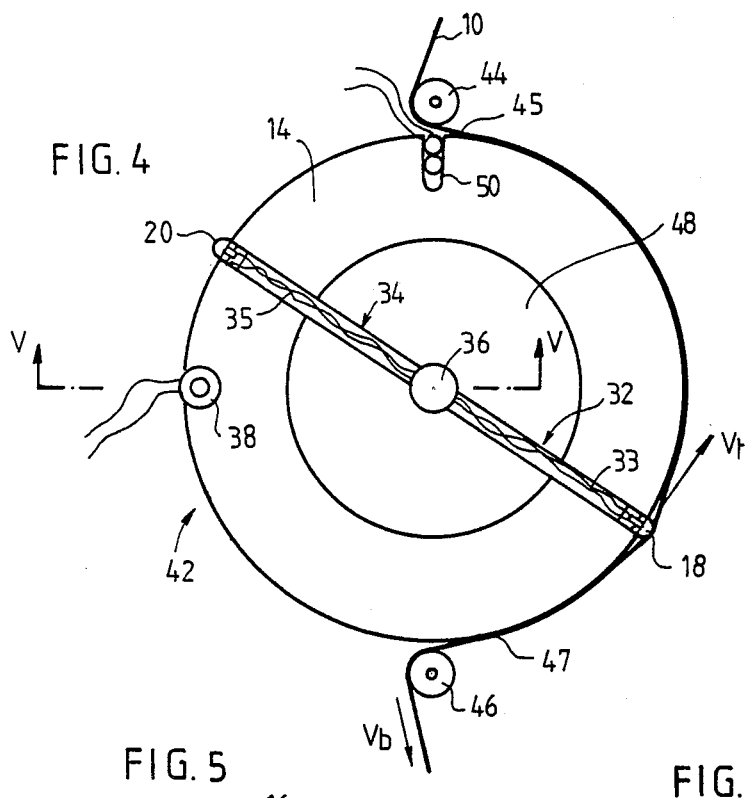
Figure 5:
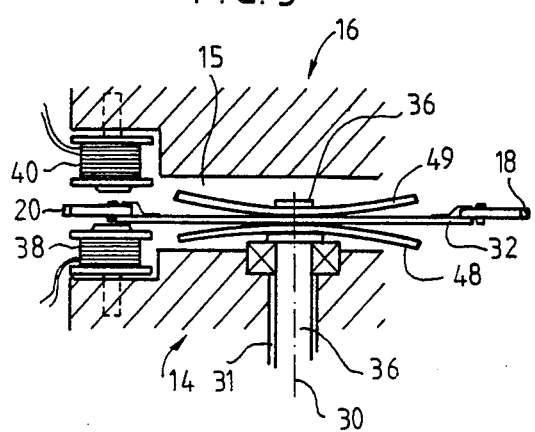
Figure 6:
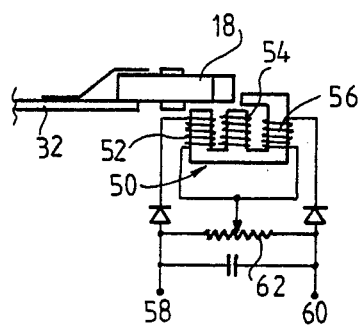

FIG. 4, taken along line IV—IV of FIG. 1, shows the tape guided part way around the drum, and the rotating head supports;

FIG. 5 is a section taken along line V—V of FIG. 4, detailing the electromagnets, and showing a transducer head in between, and FIG. 6 is an electrical schematic of one of the head position sensors.

Figure 2:
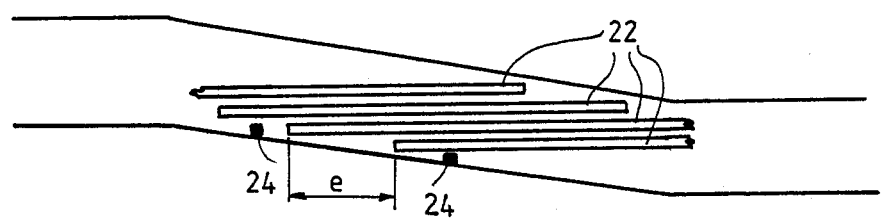
FIG. 2 shows parallel tracks arranged on the tape, diagonally to its length.

FIG. 1 shows a magnetic tape 10 passing diagonally by a drum 12 which includes a pair of fixed disks 14, 16 on either side of a pair of magnetic transducer heads 18 and 20 rotating in a plane. Data frames can be recorded on and read from parallel tracks 22 on the tape at an angle to its length, as shown in FIG. 2. As they rotate, heads 18 and 20 follow tracks 22. While each head rotates between the end of one contact with tape 10 at point 47 on the drum, and the beginning of the next contact at point 45, FIG. 4, the tape moves the longitudinal distance "e" as shown in FIG. 2 between tracks. When the tangential speed of a head and the longitudinal speed of the tape are no longer synchronized, which occurs when the tape speed is increased or decreased to effect time compression or expansion, the head will trace the wrong angle on the tape, FIG. 3.

The rate at which tracks 22 pass is typically sensed from gauge marks 24 along an edge of the tape, and compared with the head's rotational speed, by means conventional in the art. The wrong speed ratio means that the head is not tracking at the correct angle, and its trajectory needs to be adjusted.

For example, suppose that the correct tracking angle is $\theta$ as indicated by line 26, and then suppose that the tape speed $V_b$ is reduced by half. The new correct tracking angle $\phi$ will be line 28. As indicated by the arrows, the head 18 or 20 should be displaced to start tracking below its normal plane, return to its normal (zero displacement) level as the middle of the track 22 passes, and continue higher to read the last half of the track. Before starting to read the next track, the head must be lowered again. If the speed difference is reversed, so are the necessary corrections.

To cause the head to follow the new tracking angle, the present invention displaces the head transversely to its average plane of rotation, throughout its path of contact or cooperation with the tape, by means of a device which remains stationary with respect to the head. The head may be displaced by applying transverse force at one or more selected fixed locations along its circular path. Thereafter, return forces urge the head back to its equilibrium level, and a transverse oscillation movement ensues which can be maintained by the periodic passage of the head by the transverse force application location.

In a preferred embodiment, each head is mounted at a radially outward end of a support arm rotatable around an axis 30 coaxial with that of a drum. Supports 32, 34 are attached to the center of rotation of a shaft 36, which is disposed in an axial bore 31.

The support, while practically inflexible in the direction tangential to the rotation of the head, is flexible in a direction transverse, typically perpendicular, to the average plane of rotation. When the head is rotating, it is subjected to centrifugal force which tends to return it towards its equilibrium position after each periodic application of the transverse force.

A pendulum movement of the head ensues, which is maintained by the periodic passage of the head by the transverse force location. The force can be applied to another mass contiguous with, and attached to, the head. The pendulum motion can be maintained by electrostatic, magnetic field, etc., forces, along the trajectory of the head. The necessary head displacement parallel to axis 30 is calculated by suitable circuits, not shown, which can be provided by those skilled in the art. Depending on the magnitude of the correction needed, a certain voltage, for example, is applied to either of electromagnets 38 and 40, causing the head to oscillate like a pendulum.

Relative to the tape, the trajectory of the heads is a sinusoid having its amplitude dependent on the pendulum force. To minimize the non-linear effect of the sinusoidal movement, the drum 12 should be arranged to scan tracks 22 in less that a 180° arc on both sides of a zero-crossing. The magnet(s) 38, 40 should be located on drum 12 on the side 42 opposite tape 10 and on a line bisecting the reading arc, which will be at the other zero-crossing of the heads 18,20.

Placing the magnets thusly has the advantage of avoiding interference with the operation of the heads while reading a track. The heads themselves being formed of ferromagnetic material, they respond to the magnetic force, and no additional elements are needed.

The length of the support 32, 34 and head 18,20 for beating at the wanted period, typically the same as its revolution, is shown by equating the period $T_p$ of a simple pendulum of length 1 in a field of acceleration $\gamma$ independant of the mass suspended, $$T_p = 2\pi \sqrt{\frac{1}{\gamma}}$$

and the period of rotation for a mobile having the centrifugal force of acceleration $\gamma$ at a distance r from its center:

$$T_m = 2\pi \sqrt{\frac{r}{\gamma}}$$

Therefore, under centrifugal force, a simple pendulum of length l=r has the same period of oscillation as of revolution, whatever the mass and the plane of oscillation considered (with exception of parasitic phenomena such as the "Coriolis effect").

In the preferred embodiment, a magnetic tape 10 surrounds about 180° of a fixed cylindrical drum 12 with a radius of several centimeters, separated into two disks 14 and 16 by a slot 15 several millimeters wide, perpendicular to the drum axis 30. FIG. 4 shows the lower disk 14 from above. The upper disk 16 of the drum is shown in FIG. 5. The tape 10 is guided around the drum by two rollers 44 and 46. The lower disk 14 has an axial bore 31 for a drive shaft 36 which is supported by bearings and turned by a motor, not shown. In the slot 15, shaft 36 holds one or more head supports 32 and 34 made of a resilient plastic or metal such as copper, berylium, stainless steel or polyamide. Supports 32 and 34 are ribbons each several hundreths of a millimeter thick and several millimeters long, so that the heads 18 and 20, attached to their extremities, protrude slightly, not more than a few hundreths of a millimeter, beyond the periphery of drum 12. The flexible ribbon with the mass of the magnetic head at its end constitutes the pendulum.

The weight of the head and ribbon is significant compared to the centrifugal force until a sufficient rotational speed is attained. Therefore, some device is needed to maintain the head and ribbon perpendicular to the shaft. Two conical washers 48 and 49, several millimeters less in diameter than drum 12, are mounted divergently on shaft 36 to permit the heads to attain operational speed before centrifugal force straightens supports 32 and 34. The washers 48,49 are separated by not more than several tenths of a millimeter at their periphery. Electrical connecting wires 33 and 35 to the hands follow supports 32 and 34 to grooves in shaft 36.

At operational speed, the pendulum weight is insignificant in comparison to the centrifugal force. If the friction between the head 18,20 and the tape 10 damps the pendulum oscillations excessively, inert mass (not shown) can be added to each head as ballast without affecting the oscillation period. If the oscillation damping coefficient is weak, a control loop utilizing a position sensor or track following information can modulate the forces applied to the support 18,20.

The pendulum oscillation can be maintained by electromagnetic coils 38 and 40 positioned vis-à-vis in openings in upper and lower drums 14 and 16, respectively, at the mid-point of the arc 42 opposite the tape reading surface of the drum. The coils have a permeable core which is supplied with alternating current to act on heads 18 and 20 as they pass, with a force of attraction in proportion to the square of the induction. An analog or microprocessor-based controller excites one or the other of coils 38 and 40 to maintain the amplitude of the oscillations at their appropriate value. Supplying the coils with alternating current avoids magnetizing, and considerably reducing the performance of, heads 18 and 20. Instead, the heads are demagnetized once per revolution.

An example of a position sensor 50 for measuring the osicllation amplitude is shown in FIG. 6. This sensor could be placed in another opening in the periphery of one of the disks 14, 16 and in quadrature with coils 38 and 40, thus at a peak in the head oscillations. Sensor 50 is a type of mutual inductance sensor, comprising a double magnetic circuit.

Each time one of the heads 18 or 20 passes, its permeable segment partially closes the gap in the loop around branches 52 and 54, with a double clearance which is a function of the head position. The loop around branches 54 and 56 has a fixed gap and therefore a fixed reluctance. The difference in reluctances between the loops may be measured by comparing the coupling between a primary winding on the common branch 54, or in symmetrical parts in series on branches 54 and 56, and two secondary windings on branches 52 and 56. A detection circuit working at the revolution frequency, which is in the range of several hundred hertz, gives a voltage between points 58 and 60 proportional to the displacement of the head 18 or 20 with respect to its middle level. The potentiometer 62 can be calibrated to zero for a resolution of several micrometers. Depending upon the position sensed, the voltage in coil 38 or 40 is then adjusted, with a lag of three-quarters of a turn, for example, to increase or reduce the amplitude of the oscillations to better approximate the trajectory slope desired for correct tracking.

Figure 3:
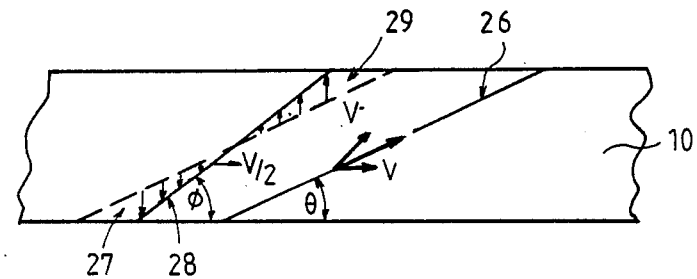
FIG. 3 shows the vector components $V_b$ (tape speed) and $V_t$ (head speed) of the angle of the track traced out by the head, and also shows how the trajectory of the head must change when the ratio of speeds changes.

FIG. 3 shows the trajectory 26 of the head with respect to the tape while the tape is moving at is normal speed $V_b$. The components of the angle between the relative trajectory and the tape border are the tape and head speed vectors. If the speed of the tape is, for example, halved, the head trajectory angle is modified according to 28. To be able to follow the track in re-reading for example, the position of the head must be modified as shown by arrows 27 and 29.

If the rotational speed of the heads if varied around its nominal value, to adapt to continuously varying rates of information transfer, the period of pendulum oscillations will remain equal to the period of revolution, thereby following the variation, and preserving the usefulness of the present invention.

Although for clarity only two magnetic heads 18 and 20 are illustrated, a larger number of heads, one-track or multitrack, could be used in the same fashion. Several heads may be positioned using one actuator mounted on the stator or disk. Excursions of several hundred micrometers are possible, and rotor construction is simplified over the prior art practice of attaching piezo-electric material with connecting wires to the rotor.

Those skilled in the art will be able to modify the invention without departing from its spirit or scope.

What is claimed is:

1. A rotatable magnetic transducer assembly comprising:
    a rotatable shaft;
    a magnetic transducer head;
    a support attached to the axial center of the shaft, adapted to rotate, and to be relatively inflexible, in a plane perpendicular to the shaft, and to be relatively flexible in the direction parallel to the shaft, and having a radially outward end supporting the head; and
    tracking alignment means, for controllably deflecting the head parallel to the shaft at least once per revolution, comprising means disposed adjacent the end of the support which supports the head for detecting the position of the head in the direction parallel to the axis of rotation as the head passes by a sensor and for outputting a signal indicative thereof, and means disposed adjacent the support for periodically applying a magnetic field to the support directly to the and head for controllably deflecting the head in the axial direction in response to the signal output by the position detecting means.

2. A transducer assembly as in claim 1 and further comprising a drum made up of first and second disks mounted coaxially to the shaft, the disks having parallel planar faces separated by a slot within which said support is rotatably disposed, the disks having equal radii slightly less than the distance from the axis to the radially outer side of the head.

3. A transducer assembly as in claim 1 wherein said deflecting means includes means for controllably deflecting the head parallel to the shaft at least once each revolution such that natural pendulum oscillations of the head are excited.

4. A transducer assembly as in claim 3 further comprising means for indicating the ratio of the longitudinal speed of a tape passing the drum to the rotational speed of the heads, and in response to the indicating means for changing the position of the head in order to trace tracks at a given angle on the tape.

5. A transducer assembly as in claim 1 wherein said deflecting means is at least one electromagnet disposed adjacent the support.

6. A transducer assembly as in claim 1 comprising a plurality of supports, and a magnetic transducer head attached to an end of each support.

7. A magnetic transducer for use with a data tape recorder or playback machine, comprising:
    first and second disks of substantially the same radius, mounted coaxially and spaced apart by a narrow slot and having coarcuate tape bearing surfaces;
    a rotatable shaft disposed in an axial passage through one of the disks and having a joint in the slot;
    at least one support attached to the joint and having a tip extending to the periphery of the disks so that as the shaft turns, the support rotates in a palne in the slot, said support arm being inflexible in its plane of rotation and flexible in a direction substantially perpendicular to its plane of rotation;
    a magnetic transducer head mounted on the tip of said support and extending at least to the periphery of the disks;
    at least one position sensor mounted in the periphery of one of said disks and facing the slot for sensing the displacment of the head from the plane of rotation of the support; and
    at least one electromagnet mounted in the periphery of one of said disks opposite from, and on a line bisecting the arcuate surfaces and facing the slot, said electromagnet being responsive to said positon sensor for exerting a controllable magnetic force directly on the head as the head passes and to deflect the head in a direction perpendicular to its axis of rotation.

8. A transducer as in claim 7 and wherein said at least one electromagnet comprises a pair of electromagnets mounted facing each other, one in the periphery of each of the disks.

9. A transducer as in claim 7 and wherein said arcuate surfaces extend over an arc of approximately 180° and said sensor is placed near an end of the arcuate surfaces.

10. A transducer as in claim 7 and wherein said at least one support comprises two supports extending in diametrically opposite directions from said shaft, and wherein each support has a tip bearing a magnetic transducer head.

11. A transducer as in claim 7 and wherein said sensor comprises a mutual inductance sensor whose inductance changes as a function of the proximity, and therefore the axial position, of the magnetic head to the sensor, the transducer further including means for sensing the inductance of the sensor and for producing a signal therefrom indicative of the position of the head.

12. A transducer as in claim 11 and further comprising a control circuit for regulating the force exerted by the electromagnet on the head in response to the signal produced by the sensor.

13. A magnetic transducer as in claim 7 and further comprising a pair of washers attached to the shaft on either side of the support, said washers diverging away from the support and from each other as their radii increase to a distance short of the periphery of the disks.

14. In a transducer of the type including a magnetic transducer head mounted to the end of a rotating support, the support being relatively inflexible in its plane of rotation and relatively flexible in a direction transverse to its plane of rotation, a method of modifying the trajectory of the rotating magnetic transducer head with respect to its plane of rotation comprising the steps of: (a) periodically applying a magnetic field directly to the magnetic transducer head and transverse to and within the plane of rotation; and (b) responsive to said magnetic field inducing said head to oscillate in a direction transverse to the plane of rotation.

15. In a magnetic transducer of the type including first and second tape bearing disks of equal radius disposed on a common axis and separated by a narrow slot, one of the disks having a passage along its axis and a rotatable shaft disposed in the passage, a support extending through the slot to a radius no greater than that of the disks, the support being inflexible in its plane of rotation and flexible in the direction perpendicular to the plane of rotation, and magnetic transducer head mounted to the end of the support, a method of aligning the trajectory of the transducer head to tracks arranged diagonally on a tape moving by the tape bearing disks, comprising the steps of:

sensing the longitudinal speed of the tape relative to the rotational speed of heads, and determining therefrom whether the heads are scanning the tape at the requisite angle to follow the tracks;

orienting an electromagnet at the periphery of the disk and applying a signal to the electromagnet to directly deflect the head as it rotates past the electromagnet; and adjusting the amplitude of the signal applied to the electromagnet to deflect the head with a predetermined amplitude such that the slope of the oscillation as the head crosses its plane of rotation is the slope needed to follow the tracks.

* * * * *